United States Patent [19]

Mammel, Jr.

[11] Patent Number: 5,446,881
[45] Date of Patent: Aug. 29, 1995

[54] DATABASE STORAGE AND RETRIEVAL METHOD USING A DECLINING STAGE SIZE AND REPETITIVE SEARCHES

[75] Inventor: Lewis H. Mammel, Jr., Wheaton, Ill.

[73] Assignee: AT&T Corp., Murray Hill, N.J.

[21] Appl. No.: 951,080

[22] Filed: Sep. 25, 1992

[51] Int. Cl.6 .............................................. G06F 12/00
[52] U.S. Cl. .............................. 395/600; 364/DIG. 1
[58] Field of Search ...................... 395/600; 380/49; 364/DIG. 1

[56] References Cited

U.S. PATENT DOCUMENTS

| | | | |
|---|---|---|---|
| 4,611,272 | 9/1986 | Lomet | 395/600 |
| 5,058,002 | 10/1991 | Nakamura | 395/600 |
| 5,199,073 | 3/1993 | Scott | 380/49 |
| 5,204,958 | 4/1993 | Cheng | 395/600 |
| 5,264,088 | 11/1993 | Baird | 395/600 |

*Primary Examiner*—Thomas G. Black
*Assistant Examiner*—Jean R. Homere
*Attorney, Agent, or Firm*—Michael B. Johannesen

[57] ABSTRACT

A hashing database system that efficiently handles collisions comprises a list of data blocks divided into a plurality of stages, each of which is geometrically smaller than the preceding stage. The key of the data to be stored or retrieved (the "desired key") is hashed and, along with the stage number, used as an input into a staging algorithm to derive an offset into the list. One or more data blocks in the list surrounding the hashed-to data block are checked to determine whether the key field in the data block matches the desired key. If the keys match, then the desired data block is found. If the desired key is not found, then the hashed key is again used as an input into a staging algorithm along with the stage, and a new offset is derived and used as an index into the next stage of the index list. These steps are repeated until the key is found or the last stage is reached. The last stage is an overflow where the data is guaranteed to be found or space is guaranteed to be found for insertion of new data if not found in one of the stages.

7 Claims, 4 Drawing Sheets

DATABASE STORAGE AND RETRIEVAL METHOD USING A DECLINING STAGE SIZE AND REPETITIVE SEARCHES

CROSS-REFERENCE TO RELATED APPLICATION

This application is related to U.S. patent application of R. T. Emery, C. A. Priddy, and E. D. Scott, entitled "Shared Tuple Database Storage Method", and to U.S. patent application of C. A. Priddy and E. D. Scott, entitled "Nonblocking Memory Reclamation Method", filed concurrently with this application.

TECHNICAL FIELD

This invention relates to the field of databases, and more specifically to database storage and retrieval methods.

BACKGROUND OF THE INVENTION

In continuously operating, real-time operating systems, such as the operating systems in telephone switching systems, data allocation and retrieval efficiency of the database are critical. A telephone switching system may make several database queries for a telephone call routed through the system. Therefore, advanced techniques must be used to ensure that data can be read and changed in the most efficient manner possible.

"Hashing" is used in many database storage and retrieval systems in order to increase efficiency. A hashing system numerically processes one or more data items in key fields and uses the "hashed" key as an index into a memory location for storage or retrieval of data. This is a savings in memory space over systems that use a key an a direct index, because there is much wasted space in an indexed system for those memory locations that do not have any data. A hashed database stores data more densely by using a hashing algorithm that distributes keys relatively evenly over the memory spectrum.

A hashing system, however, is only as efficient as its handling of "collisions"; which occurred when a plurality of different data items hash to the same memory location. Some prior art systems use the next sequential memory location to store data when there is a collision. This technique causes further collisions when data hashes to that location. Other prior art systems have one or more "overflow" areas where collision data is stored in one long list. This technique is very costly because linear list searching is very slow.

Therefore, a problem in the art is that there is no system for efficiently handling collisions in hashing database systems.

SUMMARY OF THE INVENTION

This problem is solved and a technical advance is achieved in the art by a hashing database system that efficiently handles collisions. This hashing system comprises a list of data blocks. The list is divided into a plurality of stages, each of which is geometrically smaller than the preceding stage.

The key of the data to be stored or retrieved (the "desired key") is hashed and, along with the stage number, used as an input into a staging algorithm to derive an offset into the list. One or more data blocks in the list surrounding the hashed-to data block are checked to determine whether the key field in the data block matches the desired key. If the keys match, then the desired data block is found. Advantageously, the data blocks are in the list in ascending order, so that when the key being searched for is less than the key of the data block being examined, then no further searching of that list is needed since the key is not in that list.

If the desired key is not found in a stage, then the hashed key is again used as an input into a staging algorithm along with the stage, and a new offset is derived and used as an index into the next stage of the index list. These steps are repeated until the key is found or the last stage is reached. In the last stage, the data blocks are linked into a sequential linked list. This staged hashing system provides great savings in time over the prior art, in that there is a short list of the data to be checked for each hashed-to value which provides greater density of data items. As each stage is reached, there is a geometrically increasing likelihood that the desired data will be found. Finally, there is an overflow where the data is guaranteed to be found if not found in one of the preceding stages.

DETAILED DESCRIPTION

Figure 1:
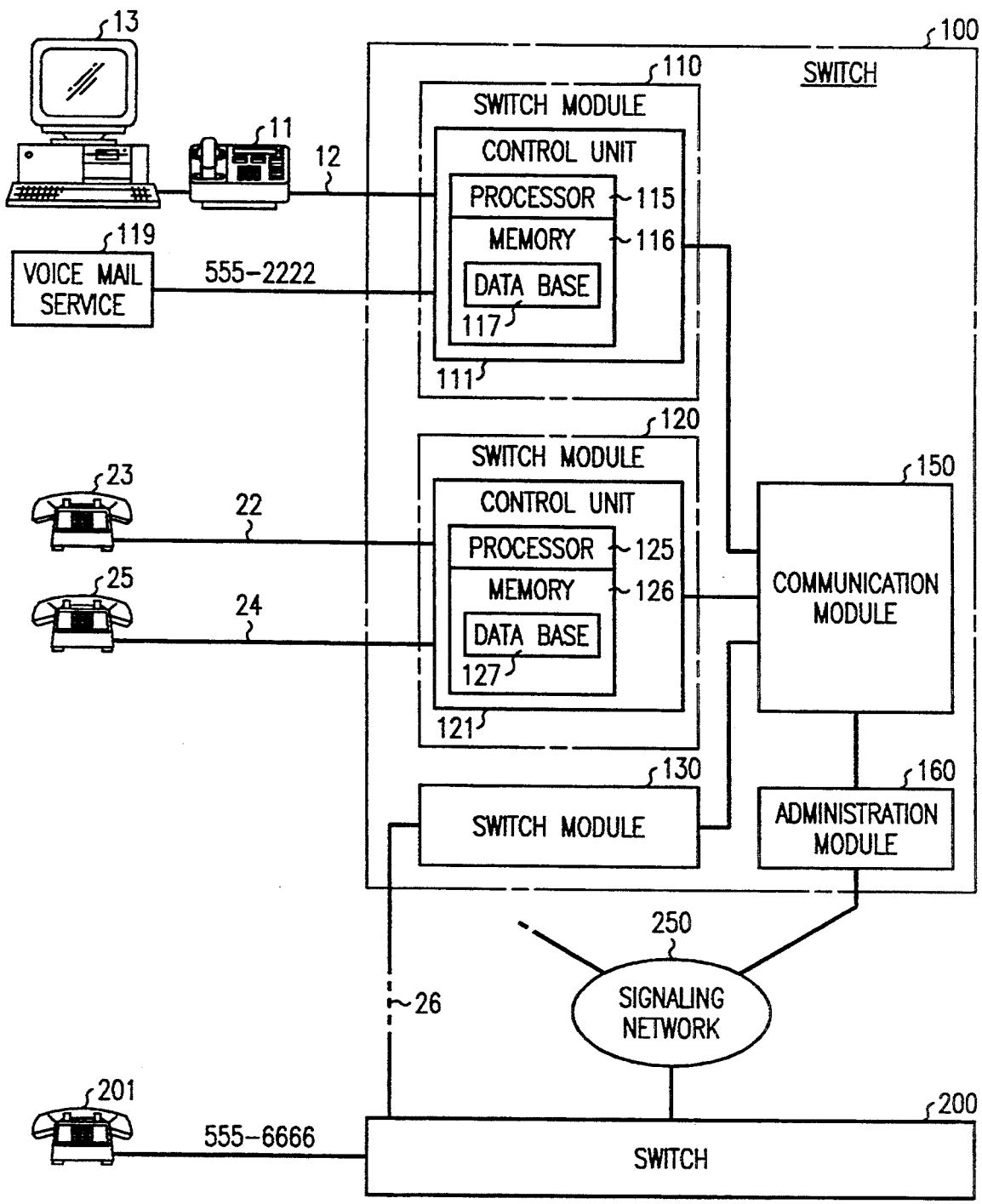
FIG. 1 is a block diagram of a switching network configuration including an exemplary embodiment of this invention.

This invention will be described in connection with a telephone switching system as illustrated in FIG. 1, but the application of this system is much broader. For example, a database access method according to this invention may be used in a general purpose program-controlled computer.

An exemplary method for storage of data in a shared tuple database is described herein in the context of a telephone switching network configuration of FIG. 1, having two central office switches, 100 and 200, an inter-switch signaling network 250, e.g., a common channel signaling (CCS7) network and illustrative communications stations, including conventional analog telephone station sets 23, 25, and 201, an integrated services digital network (ISDN) telephone station set 11, and data terminal 13. Switches 100 and 200 are interconnected by a communication path 26, which may include intermediate switches.

Illustratively, switch 100 is a distributed control, ISDN electronic telephone switching system such as the system disclosed in U.S. Pat. No. 4,592,048, issued to M. W. Beckner, et at., on May 27, 1986. Alternatively, switch 100 may be a distributed control, analog or digital switch, such as a 5ESS® switch manufactured by AT&T and described in the AT&T Technical Journal, v.64, No. 6, July/August, 1985, pp 1303–1564.

An integrated services digital network (ISDN) is a network that provides end-to-end connectivity to .support a wide range of services, including voice and nonvoice services, to which users have access by a set of standard multipurpose customer interfaces. Switch 100 includes a number of switching modules (SMs 110, 120, 130), each associated with a different set of telephone station sets or trunks. Each switching module includes a control unit for controlling connections to and from its associated telephone station set or trunks. Switching module 110, for example, includes control unit 111 for controlling connections to and from telephone station set 11. Switching module 120 includes control unit 121 for controlling connections to and from telephone station set 23.

Each control unit 111, 121 comprises a processor 115, 125 and memory 116, 126, respectively. Each memory 116, 126 includes a database 117, 127 wherein processors 115, 125 store configuration and operational data, as is known in the art. For example, a speed call list associated with telephone station set 11 is stored in database 117, and speed call lists associated with telephone station sets 24 and 25 are stored in database 127.

The architecture of switch 100 includes communication module (CM) 150 as a hub with switching modules 110, 120, and 130, and an administrative module (AM) 160 emanating therefrom. Switching module 110 terminates digital subscriber lines, e.g., 12, and voice mail service 119, which provides storage and retrieval of audio messages, as is known in the art. Voice mail service 119, comprises, in the preferred embodiment, and AUDIX® system as manufactured by AT&T.

Switching module 120 terminates conventional analog lines (i.e., tip-ring pairs), 22, 24, and provides circuit-switched connections to and from the associated telephone station sets 23, 25. Switching module 130 is similar to switching modules 110 and 120, but includes the appropriate analog or digital trunk unit (not shown) for interfacing with the outgoing trunks included in communication path 26 to switch 200.

To complete the description of switch 100, communications module 150 acts as a switch fabric for communication among switch modules and the administrative module (AM) 160. Administration module (AM) 160 provides coordination of the functional components of switch 100 and human-machine interface. Switch 200 is shown connected to a conventional analog telephone station set 201, for purposes of illustration. The architecture of switch 200 and the types of telephone station sets served by switch 200 are not important to the present invention and are thus not described further.

An exemplary embodiment of this invention will now be described in the context of a shared tuple database storage system as described and claimed in U.S. patent application of R. T. Emery, C. A. Priddy, and E. D. Scott (herein "Emery"). This invention is not limited to this system, however, as it has application in any database system that can benefit from fast access time and memory overhead savings. A shared tuple database according to the Emery invention may be implemented in switch 100 of FIG. 1, as database 127, for example. For purposes of this description, an implementation of speed calling lists in the databases of SM 120 and control unit 121 will be described, since that is an area that clearly illustrates the utility of this invention. This invention is not, however, limited to SM data bases or speed calling lists, or to switching systems.

For purposes of this illustration, telephones 23 and 25 have, as one of their features, speed calling. Speed calling provides the user with the ability to enter a one or two digit code which the switch translates into a number string and uses depending on the state of the call. The number string may be up to 32 digits in length and may include directory numbers, account numbers, access numbers, etc. for both domestic and international calling. The primary use of this feature is placing telephone calls. The user enters the one or two digit code after receiving dialtone and the switch completes the call using the retrieved number string as the directory number of the destination telephone.

For example, telephone 23 goes off-hook, receives dialtone, and a two-digit code is entered. Control unit 121 recognizes the two digit code and sends a query to database 127 in order to retrieve the number string that is associated with the code number and the calling telephone. Database 127 responds with, for example, the directory number of telephone 201 ("5556666"). Control unit 121 uses the number from database 127 in order to complete the call to telephone 201. In a specific example, telephones 23 and 25 subscribe to speed calling and to voice mail service 119 which has as its telephone number "555-2222". Advantageously, telephones 23 and 25 would generally have a speed calling code associated with voice mail service 119.

Figure 2:
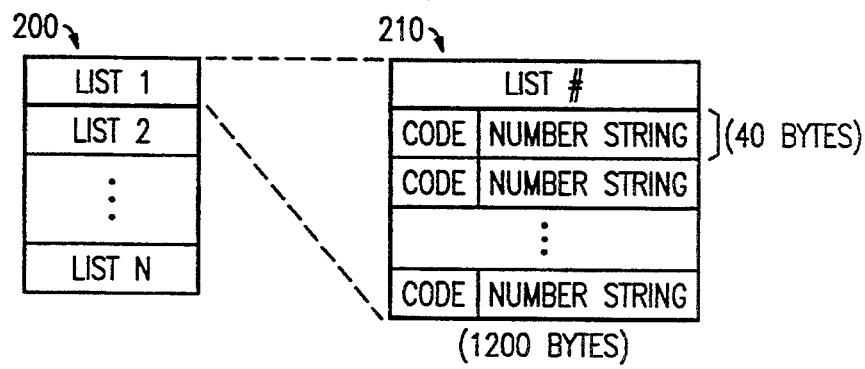
FIG. 2 is a block diagram of a prior art data base layout, as may be found in switching systems such as FIG. 1.

FIG. 2 shows a data structure for a prior an speed calling database relation. In the prior art, the database stores a plurality of structurally identical speed calling lists 200. Each individual speed calling list 210 has a list number that corresponds to the telephone. Next, for every possible speed calling number, a memory location is assigned comprising space for the maximum number of permissible digits for a speed calling entry (in this example, 32). Each entry in the list requires 40 bytes and each list may be 30 entries; therefore each list requires 1200 bytes. A list is preallocated for each telephone subscribing to speed calling because systems cannot allocate or deallocate database memory locations fast enough for potential changes of entries.

According to statistical analysis of databases of operating telephone switching systems, most speed calling subscribers only use one or two numbers in a speed calling list. The rest of the entries are not used. Additionally, there may be redundant entries across speed calling lists. For example, the directory number of voice mail service 119 in the speed calling list of telephone 23 and the speed calling list of telephone 25. A further example of redundant entries is community emergency service numbers in a residential community. Thus, the prior art shows that there is much redundant data and empty space in the database associated with a primary relation, such as a speed calling list.

Figure 3:
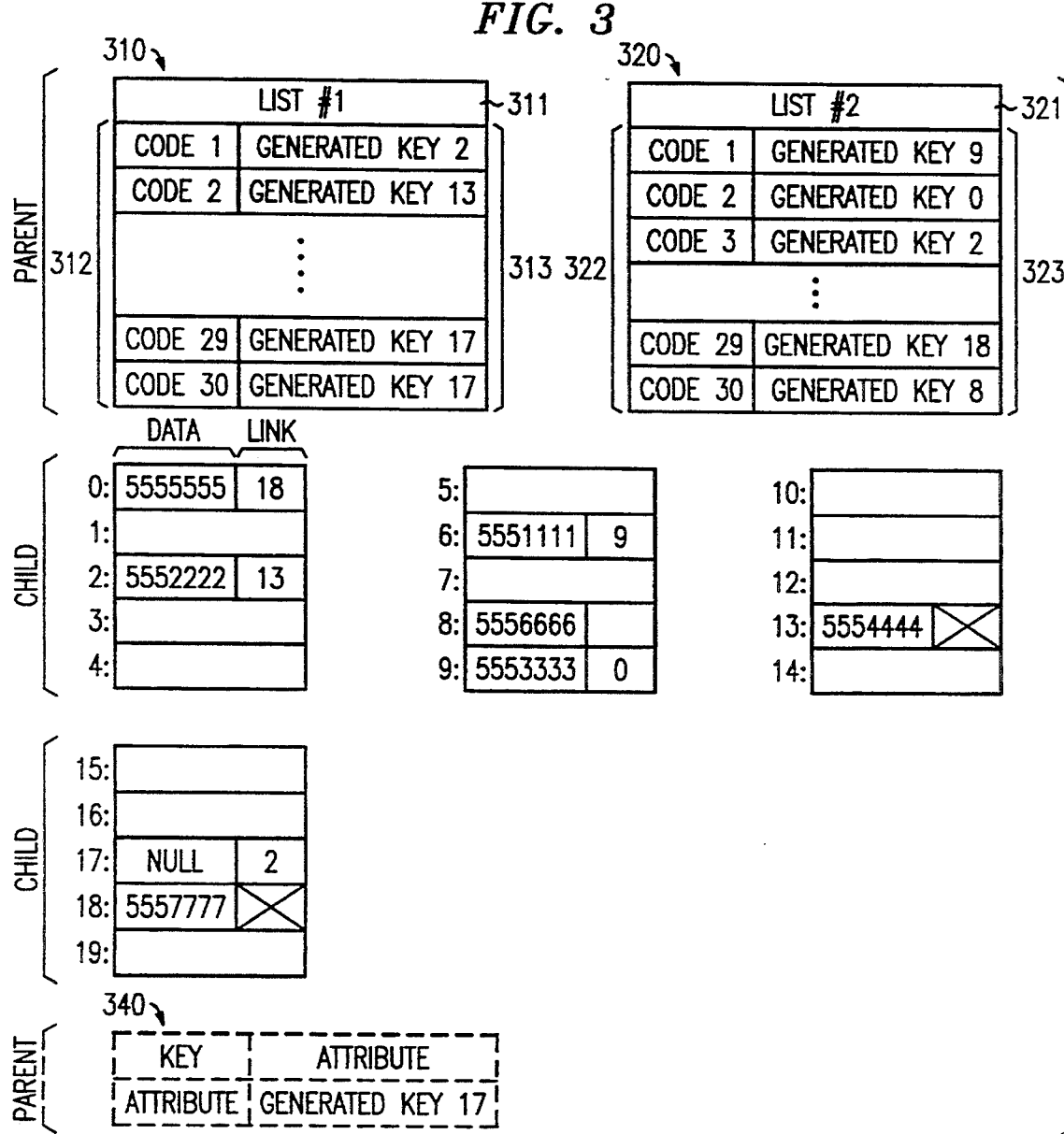
FIG. 3 is a block diagram illustrating the logical structure of a database layout according to the exemplary embodiment of this invention, in the context of a speed call list used by a switching system such as FIG. 1.

FIG. 3 shows a logical block diagram of a speed calling relation according to an exemplary embodiment of this invention. Each telephone in the above example, 23 and 25, has a root or "parent" speed calling tuple, 310 and 320, respectively, related to the directory number of the telephone. Each root tuple contains a primary key 311, and 321, which corresponds to a telephone, a list of codes 312, and 322 (the speed calling code digits, as in the prior art), and a plurality of generated keys 313, and 323, corresponding to the codes on a one-to-one basis. Each generated key is an index into a data page containing a child tuple. Since speed calling number strings may be up to 32 digits, parent/child tuples may store only a few digits and also include a generated key to further tuples (not shown for clarity) for further digits as part of the data field. Parent/child tuples may also include a plurality of generated keys. Each child tuple comprises a data block containing a number string and a link (explained below in connection with FIG. 5).

In this example, list 310 associated with telephone 23 includes a generated key of child tuple 2 as being one of the speed calling numbers. List 320 associated with telephone 25 also includes the generated key of to tuple 2 as being one of the speed calling numbers (this corresponds to the stored data "5552222", the telephone number of the voice mail service). This is the case, for example, if both telephones 23 and 25 have the directory number for voice mail service 119 (FIG. 1) on their respective speed calling lists. In this manner, redundant data can be stored once, thus realizing a memory savings.

Similarly, statistical analysis has shown that a very low percentage of speed calling lists actually comprise more than 16 digits (only 7 digits are shown in FIG. 3 for clarity). Therefore, while there are generated keys in child tuples to reference additional digits, almost all reference the same tuple, tuple 17, which contains a Null string, thus garnering an even larger memory savings. Furthermore, parent tuple 340, from an additional, unrelated relation comprising a plurality of attributes, as know in the art, may also reference Null tuple 17. In this manner, all tuples in all relations that include a similar Null string may reference tuple 17, further increasing memory savings.

An exemplary embodiment of this invention will now be explained in connection with FIG. 4. This invention provides staged hashing into memory using a "divide and conquer" theory of operation. This staged hashing system comprises a list 410 having a plurality of data blocks 420 for example. The list is divided into a plurality of stages, stages 0–N, each of which is geometrically smaller than the preceding stage.

The key 430 of the data to be stored or retrieved is hashed and used as one input into equation 1. In the exemplary embodiment of this invention, the key is "folded" as is known in the art, but the exact hashing method is not important, as any hashing method will work with the invention. In equation 1, N is the number of the stage (starting with stage 0) and hashval is the key after hashing.

$$h(N) = \sum_{i=0}^{N-1} \text{tuples in stage } N - 1 + \text{(hashval(modulo (tuples in stage } N))} \quad [1]$$

Equation 1 for stage 0 yields offset 0 which is used as an index into list 410. The entry in list 410 indexed by offset 0 provides the starting point for examining data blocks 420. Each of the data blocks 420 includes a key field and a data field. Key 430 is compared to the key field in the data block to determine whether a match has been found. If not, the data blocks immediately surrounding the indexed data blocks may be checked in the same manner until key 430 is found. Advantageously, the data blocks may be in ascending order according to the value of the key, so that when key 430 is less than the key of the data block being examined, then the key is not in the list. According to this invention, only a few data blocks are examined in order to find a match or before moving to the next stage.

If no match is found, then the hashed key is again applied to equation 1, along with stage N=1, yielding offset 1. Offset 1 is used as an index into the next stage, stage 1, of the list. These steps are repeated until the key is found or the last stage is reached. In the last stage, the data blocks are in a list and the list is linearly searched.

Figure 4:
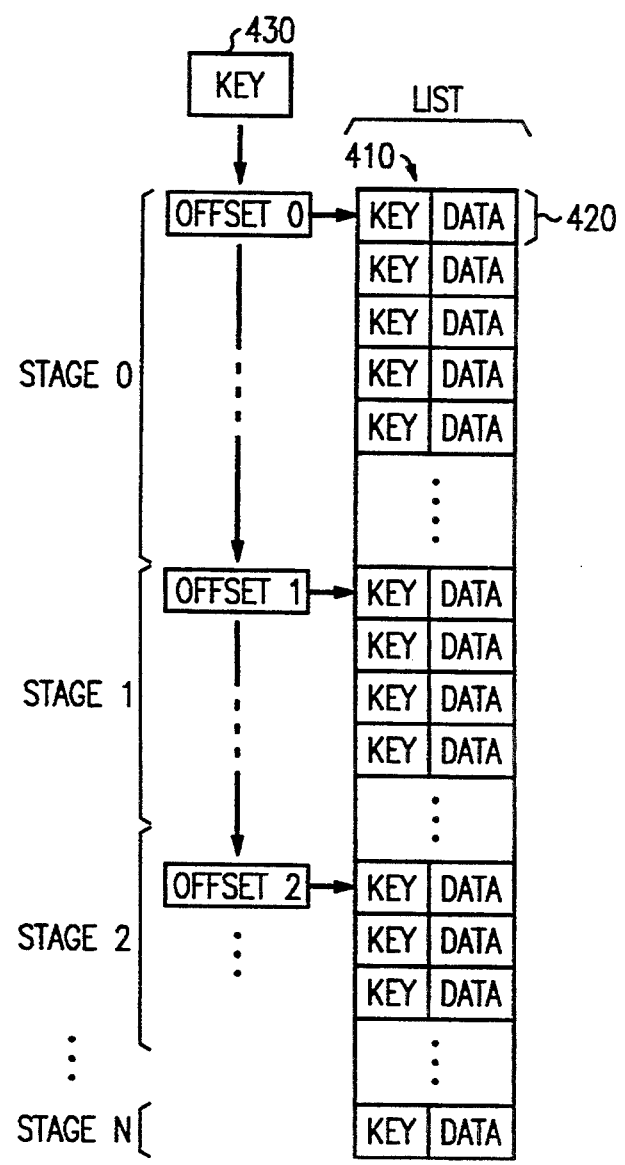
FIG. 4 is a block diagram of the physical structure of a database layout according to the exemplary embodiment of this invention.
Figure 5:
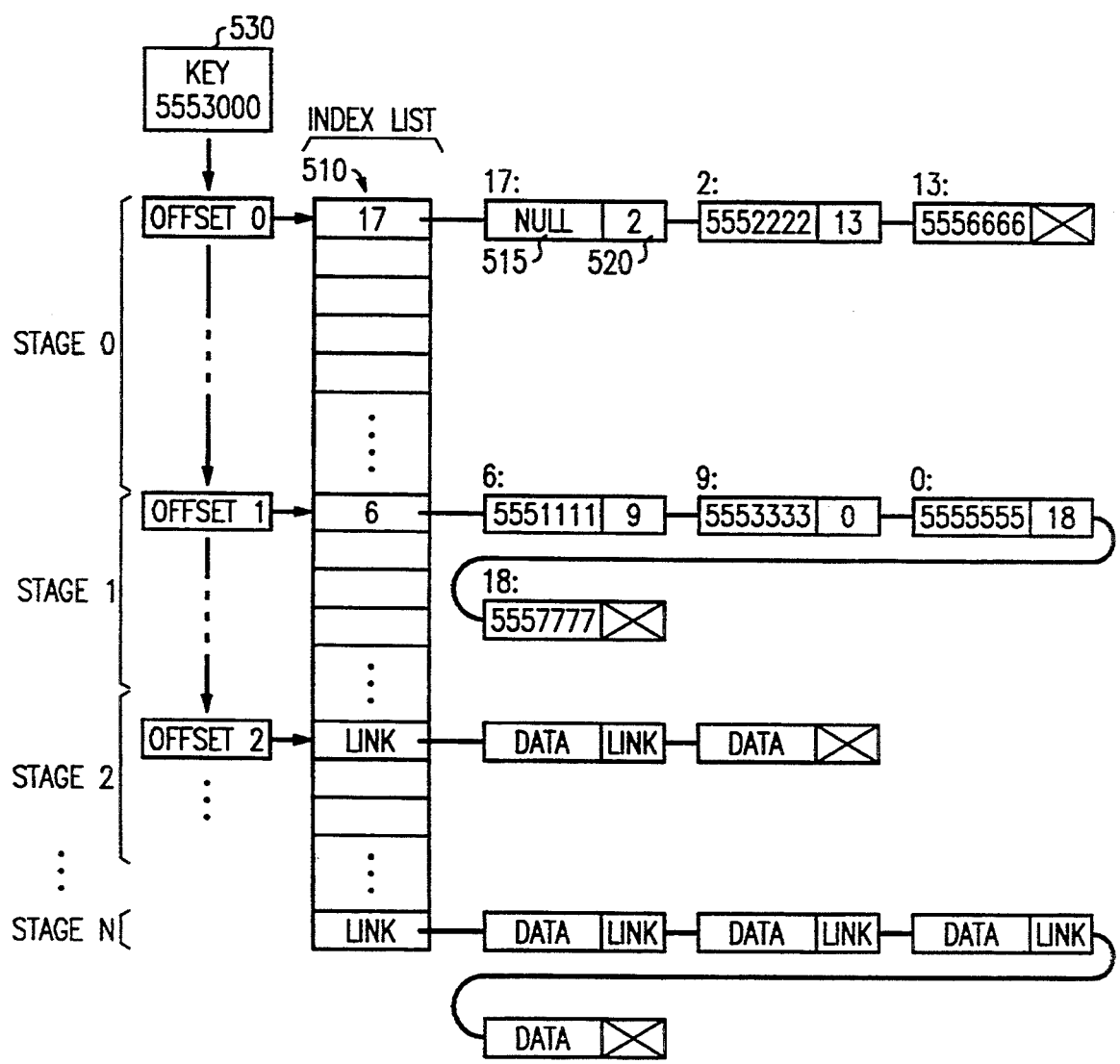
FIG. 5 is a block diagram of an application of the database layout of FIG. 4.

FIG. 5 illustrates the physical structure of a database according to Emery utilizing an exemplary embodiment of this invention in FIG. 4. The physical structure of this database comprises a plurality of data pages of memory, as known in the art, containing an index list and a plurality of data blocks, or tuples. The embodiment of Emery uses a bucket list, as is known in the art, in order to save further memory. Index list 510 comprises a plurality of links, each of which point to a singly-linked list of tuples. Each index is a header block that is linked to tuples containing data that hashes to that index.

Index list 510 comprises sequential tuples on consecutive data pages, divided into stages, as in FIG. 4. In order to quickly and efficiently access data in the linked list, the key 530 is "hashed" as is known in the prior art, and applied to equation 1 to derive an offset: (hashval(N), as above) into index list 510, where N is the stage number.

If the data is not found in the zeroth stage (stage N=0), then "hashval" is applied again to equation 1 for stage N=1 to derive offset 1. It is increasingly likely that the desired data will be found as each stage is reached, as it is increasingly unlikely that each key will hash to identical locations within each stage in index list 510. Once an index into index list 510 is determined, the data tuples in the associated linked list are checked.

Each data tuple comprises a control word (not shown for clarity in these drawings), a data section and a link to a next tuple in the linked list of tuples. The control word comprises a plurality of status bits used to control garbage collection, as described in Emery. Preferably, there are 10 tuples or less in any linked list, in this exemplary embodiment. Tuples in the linked list contain data items that are stored in ascending order according to their value, for example, the first list includes "NULL", "5552222", "5556666". The second list includes "5551111", "5553333", "5555555", and "5557777".

According to this exemplary embodiment, redundant data is preferably stored only once. Therefore, when a new tuple is added to the database or an existing tuple is changed, the database is searched to determine if the data in the new tuple already exists in the database. If the data is extant, then an index to the tuple containing the data is linked to the parent tuple, and the addition or change is complete. If the data is not found (that is, does not currently exist in the relation), then a new tuple is added to the relation containing the new data, and an index to the new tuple is linked to the added or changed parent tuple.

Insertion of data, according to this invention, uses a novel searching system. The key 530 of the data to be inserted is hashed, as is known in the art. In the preferred embodiment of Emery, the key is the entire data field. The hashval and stage N=0 is applied to equation 1 to derive offset 0. Offset 0 is then used as an index into the zeroth stage index list to obtain a pointer to a singly-linked list of tuples. An examination is made of the data content of each tuple, searching for a match with the data to be allocated. If the content is not found in the first data block, then the link is followed to the next data block, etc. A comparison is made to determine if the binary value of the data (key 530 in this exemplary embodiment) to be inserted is greater than the binary value of the data in the tuple. If it is greater, then the number of tuples in the linked list is noted (as will be explained below) and the next index list is searched. If there is a content match between a tuple and the data to be inserted, then a reference to that tuple (that is, the index to the data page for that tuple) is given to the parent relation. If the data item was not in the first linked list, then optionally a search may be made of the next index after the hashed-to index, following the chain of tuples as above. If the data item is still not found, a further index list may be checked.

Next, if the data item is not found in the zeroth stage, the hashed key is again applied to equation 1 for stage N=1 to derive offset 1. Offset 1 is then applied to the first stage index list, and the link list of tuples is again followed, as above. Each subsequent stage provides a search reduction technique to search through the set of all tuples that overflowed the previous stage. This mechanism provides a very high memory utilization (high data density in memory) with reduced search and reduced algorithmic complexity.

If the data is not found, then a new tuple is allocated for the data. The location of the new tuple is chosen by finding either the lowest value free (unused) generated key tuple in the relation regardless of the data content to be stored in that tuple. The newly allocated tuple is then linked into one of the linked lists. To this end, the list chosen is determined during the first search (that determined the nonexistence of the data). While the system is searching for the data content, the first list with less than the target length (10 in the exemplary embodiment) is stored, along with the data tuple location that is less than the tuple being searched-for, and whose link references either a tuple with data greater than the searched-for data or the list termination value. Once the non-existence of the data content is determined, a quick search is made starting at the stored data location to accommodate concurrent inserts. When the proper location within the selected list is found, the tuple is linked into that location. In this example, the data "5553000" may be linked between tuple number 6 ("5551111") and tuple number 9 ("5551111").

It is to be understood that the above-described embodiment is merely an illustrative principle of the invention and that many variations may be devised by those skilled in the art, without departing from the scope of the invention. It is, therefore, intended that such variations be included within the scope of the claims.

I claim:

1. A method for retrieving data corresponding to a key in a database, said database having a plurality of data blocks, each of said data blocks including a further key portion and a data portion, said data blocks being in a list, said list being divided into more than two stages, wherein the size of each of said stages, except a first of said stages, comprises fewer data blocks than previous stages said method comprising the steps of:
    a. initializing a stage number to said first stage;
    b. deriving an offset into a stage based on said key, the size of the stage and the stage number;
    c. using said offset as an index into said stage of data blocks to determine an indexed-to data block;
    d. retrieving said data if said key is the further key portion of said indexed-to data block; and
    if said key is not the further key portion of said indexed-to data block in said stage, incrementing said stage number and repeating steps b–d, wherein there is a geometrically increasing likelihood that said data will be found in each succeeding stage.

2. A method in accordance with claim 1 further including the step of, after said step of using said offset as an index into said stage, comparing said key to said further key portion in a plurality of data blocks adjacent to the indexed-to data block.

3. A method in accordance with claim 1 wherein said database includes a further list of data blocks, and wherein said further list of data blocks comprises a last stage of said database, said method including the step of
    linearly searching said list of data blocks when said stage number reaches said last stage.

4. A method for storing data in a database, said data corresponding to a key, said database having a plurality of data blocks, each of said data blocks including a key portion and a data portion, said data blocks being in a list, said list being divided into more than two stages, wherein the size of each stage, except a first of said stages, comprises fewer data blocks than art immediately preceding stage, said method comprising the steps of:
    initializing a stage number to a first of said stages;
    deriving an offset into a stage based on said key, the size of the stage and the stage number;
    using said offset as an index into said stage of data blocks to determine an indexed-to data block;
    determining if the data portion of said indexed-to data block is unused;
    if said data portion is unused, storing said data in said data portion of said indexed-to data block;
    if an unused data block is not found in said stage, incrementing said stage number and repeating the above steps, wherein there is a geometrically increasing likelihood that an unused data block will be found as each stage is reached.

5. A method in accordance with claim 4 further including the step of, after said step of using said offset as an index into said stage, determining whether there is an unused data block adjacent to the indexed-to data block.

6. A method in accordance with claim 4 wherein said database further includes a list of data blocks, and wherein said list of data blocks is a last stage of said database, said method including the step of
    when said stage number reaches said last stage, linearly searching said list of data blocks for an unused data block in said list.

7. A system for storing and retrieving desired data in memory in a database, said desired data having a key, said database having a plurality of data blocks organized into a list, said list being divided into more than two stages, wherein the size of each stage, except a first stage, comprises fewer data blocks than art immediately preceding stage, said data blocks having a key portion and a data portion, said system comprising:
    means for deriving an offset into one of said stages of said list of data blocks, said means for deriving using said key, said stage number, and said size of said stage as inputs;
    means for applying said offset to said stage to index to a data block as an indexed-to data block;
    means for determining whether the data portion of said data block contains said desired data;
    means for determining whether the data portion of said data block is empty;
    means for retrieving said desired data when said key matches said key portion of said indexed-to data block from said data portion of said indexed-to data block; and
    means for storing said desired data when said key matches said key portion of said indexed-to data block into said data portion of said indexed-to data block.

* * * * *

UNITED STATES PATENT AND TRADEMARK OFFICE
CERTIFICATE OF CORRECTION

PATENT NO. : 5,446,881
DATED : August 29, 1995
INVENTOR(S) : L. H. Mammel, Jr.

It is certified that error appears in the above-identified patent and that said Letters Patent is hereby corrected as shown below:

Column 8, Claim 4, line 15, "art" should be "an";

Column 8, Claim 7, line 47, "art" should be "an"

Signed and Sealed this

Nineteenth Day of December, 1995

Attest:

BRUCE LEHMAN

*Attesting Officer*  *Commissioner of Patents and Trademarks*